(12) United States Patent
Schaaf et al.

(10) Patent No.: US 8,157,182 B2
(45) Date of Patent: Apr. 17, 2012

(54) VACUUM HANDLING DEVICE

(75) Inventors: Walter Schaaf, Freudenstadt-Gruental (DE); Ralf Stockburger, Glatten (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 13/124,507

(22) PCT Filed: Jul. 20, 2009

(86) PCT No.: PCT/EP2009/059287
§ 371 (c)(1),
(2), (4) Date: Apr. 15, 2011

(87) PCT Pub. No.: WO2010/043429
PCT Pub. Date: Apr. 22, 2010

(65) Prior Publication Data
US 2011/0198403 A1 Aug. 18, 2011

(30) Foreign Application Priority Data

Oct. 15, 2008 (DE) .......................... 10 2008 052 812

(51) Int. Cl.
*G06K 19/06* (2006.01)
(52) U.S. Cl. ...................................... 235/492
(58) Field of Classification Search ................... 235/492; 340/572.1
See application file for complete search history.

(56) References Cited

U.S. PATENT DOCUMENTS

| 2007/0126557 A1 | 6/2007 | Kuhn |
| 2007/0187965 A1* | 8/2007 | Schaaf et al. ............... 294/64.1 |
| 2007/0216531 A1* | 9/2007 | Lee ........................... 340/572.1 |
| 2008/0174076 A1 | 7/2008 | Eisele et al. |

FOREIGN PATENT DOCUMENTS

| DE | 197 42 126 A1 | 3/1999 |
| DE | 10 2006 023 886 | 10/2007 |
| EP | 1 724 705 A1 | 11/2006 |
| EP | 1 750 412 A2 | 2/2007 |
| EP | 1 826 160 A1 | 8/2007 |
| WO | WO 2007/062849 | 6/2007 |

* cited by examiner

*Primary Examiner* — Daniel Hess
(74) *Attorney, Agent, or Firm* — Henry M. Feiereisen; Ursula B. Day

(57) ABSTRACT

The invention relates to a vacuum handling device (46) for fixing or transporting work pieces (44) comprising a plurality of components, wherein at least one of the components is provided with an RFID tag (10) and the RFID tag is provided with an RFID chip (14) and an antenna (12), wherein a switching element (16) is provided for the galvanic isolation of the RFID chip and antenna between the RFID chip and the antenna.

10 Claims, 2 Drawing Sheets

VACUUM HANDLING DEVICE

CROSS-REFERENCES TO RELATED APPLICATIONS

This application is the U.S. National Stage of International Application No. PCT/EP2009/059287, filed Jul. 20, 2009, which designated the United States and has been published as International Publication No. WO 2010/043429 and which claims the priority of German Patent Application, Serial No. 10 2008 052 812.9, filed Oct. 15, 2008, pursuant to 35 U.S.C. 119(a)-(d).

BACKGROUND OF THE INVENTION

The invention relates to a vacuum handling device for fixing or transporting workpieces, composed of several components, wherein at least one of the components is equipped with an RFID tag and the RFID tag is provided with an RFID chip and an antenna.

Vacuum handling devices are frequently used to manipulate, i.e., it lift, heavy loads, to move these loads to another location where they are set down again, or to hold or clamp workpieces for machining. The vacuum handling devices are composed of a number of components which have to be matched to each other, so that the vacuum handling devices can perform their tasks in a safe process. In particular, this is not always guaranteed with components which are used over a longer time and subject to wear. It can also not always be ensured that copied components of inferior quality satisfy all the specifications of the vacuum handling device.

For this reason, it was proposed in DE 10 2006 023 886 A1 to equip the component to be monitored with an RFID tag. It can be determined by reading the RFID tag if this is an original component. In addition, other data, such as date of manufacture, the place of manufacture, the serial number and so on can be stored in the RFID tag.

However, integration of an RFID tag in the component alone does not guarantee that the vacuum handling device can not be longer manipulated. For example, an original component with the RFID tag can be placed in the range of the reading device of the vacuum handling device, so that the reading device can be fooled and hence assumes that the vacuum handling device is equipped with an original component. However, it is impossible to detect if the original component is actually used in the vacuum handling device.

RFID tags are disclosed in WO 2007/0628949 A1, EP 1 750 412 A2 and EP 1 724 705 A1; however, the aforementioned problem can also not be solved with these types of RFID tags.

It is therefore an object of the invention to provide a vacuum handling device which is guarantees a reliable process.

SUMMARY OF THE INVENTION

This object is attained according to the invention with a vacuum handling device of the aforedescribed type by providing between the RFID chip and the antenna a switching element for galvanic separation between the RFID chip and the antenna.

Providing a switching element between the RFID chip and the antenna allows disconnection of the antenna from the RFID chip, so that the RFID becomes ineffective. Data can then be exchanged between the RFID tag and the reading device only after the switching element has been activated and a galvanic connection between the RFID chip and the antenna has been established. In this way, a component that is not properly arranged in the vacuum handling device cannot be recognized in spite of the integrated RFID tag, so that for example an error message is outputted. Only after the component has been activated by the vacuum handling device through actuation of the switching element, thereby connecting the RFID chip is the antenna, is it possible to detect the RFID tag and hence also the component and exchange data. The component therefore must be actively integrated in the vacuum handling device, since the RFID tag is otherwise not recognized by the reading device.

As already mentioned, the switching element can be actuated via the vacuum handling device. This is done, for example, by using the vacuum applied to the vacuum handling device or the vacuum present in the component for actuating the switching element.

In an alternative actuation, the switching element can be actuated with a magnet disposed in the vacuum handling device. For example, the switching element transitions from its open position into its closed position when the component approaches this magnet. The magnet is hereby arranged in such a way that the switching element can only be actuated when the component is in its proper position.

According to another alternative for actuating the switching element, the switching element can be actuated with a button disposed in the vacuum handling device by placing a workpiece on the switch. In this variant, too, the component must be properly installed, so that it has a position where a workpiece can be placed on it, so that for example a vacuum can be built up inside the component, or a button can be actuated by the workpiece, or the weight of the workpiece can deform the component.

According to another embodiment of the invention, the switching element can be a single-throw switch or a changeover switch. For example, the antenna may be connected or disconnected by the switching element. For example, when using a changeover switch as switching element, two different RFID chips may be connected to the antenna. In this way, a fault can be actively communicated to, for example, the vacuum handling device, or more particularly the control center of the device, if although the component is installed it still has a fault condition. Or it can be communicated to the control center that the vacuum handling device is operated with an improper component.

In various embodiments, the switching element can be, in particular, mechanically coupled with a piston, a membrane, a ferromagnetic element and/or a button. These control elements may be of a different nature and may be alternatively or cumulatively connected with switching element. The control elements may be controlled, for example, with the force (overpressure or vacuum) resulting from a differential pressure, with the force of a surrounding field, such as a magnetic field, a temperature difference acting for example on a bimetallic element, or in response to a directly applied force. The button can be actuated manually, by gravity, by the workpiece or by vacuum.

Additional advantages, features and details of the invention are recited in the dependent claims and are described in the following description where various exemplary embodiments are described in detail with reference to the drawings. The features illustrated in the drawings and in the description and the claims can be relevant for the invention severally or in any combination.

DETAILED DESCRIPTION OF PREFERRED EMBODIMENTS

Figure 1:
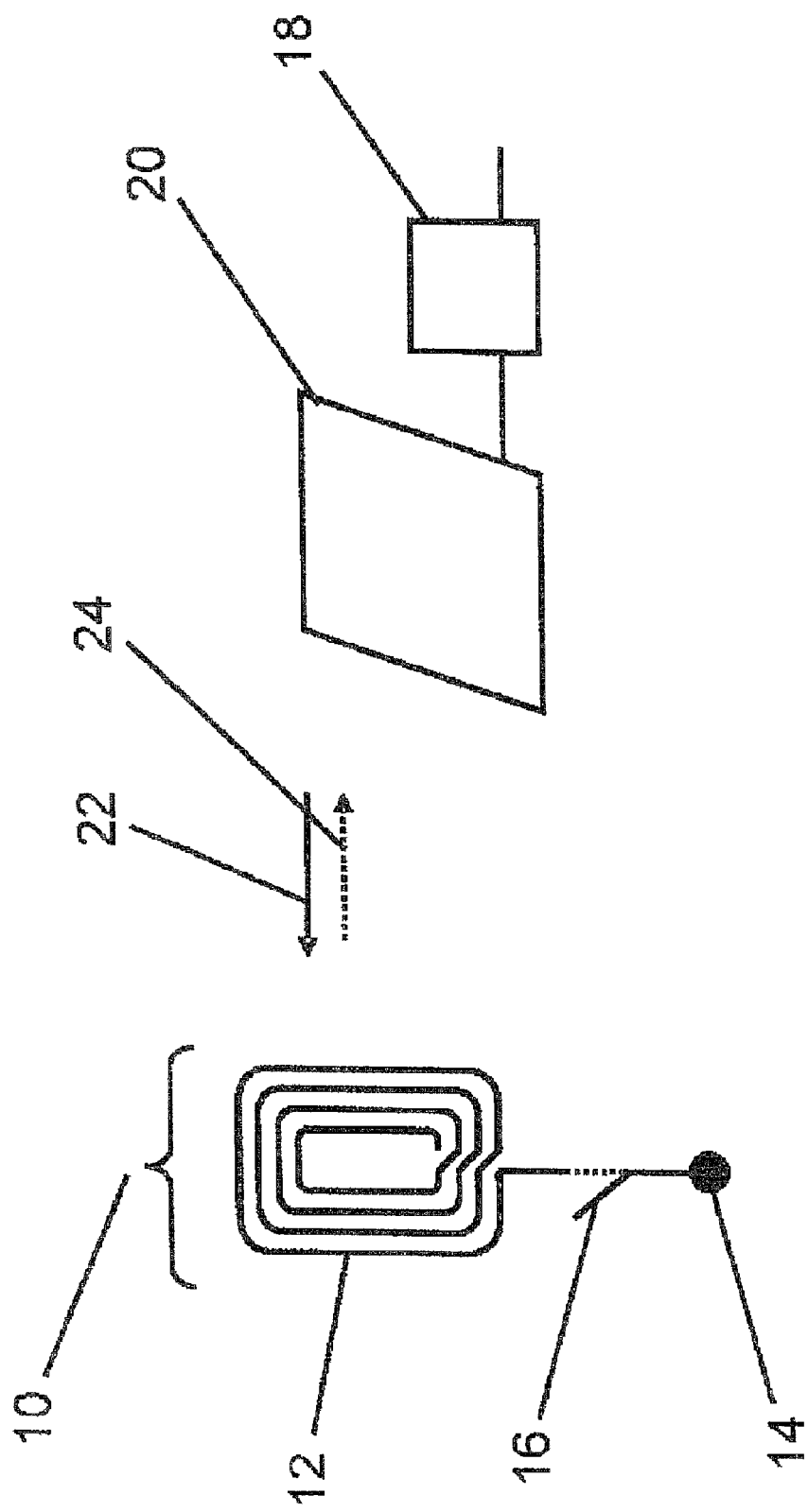
FIG. 1 an RFID tag with associated reading device in a schematic diagram.

FIG. 1 shows an RFID tag indicated in general with the reference numeral 10, which includes an antenna 12 for transmitting and receiving signals, an RFID chip 14 for storing data, and a switching element 16 arranged between the antenna 12 and they RFID chip 14. The switching element 16, which in the illustrated exemplary embodiment is implemented as a normally-open contact, is used to disconnect, in particular galvanically separate, the antenna 12 from the RFID chip 14.

A reading device 18 which is connected to an unillustrated evaluation unit is arranged in the transmission and reception range of the RFID tag 10. The reading device 18 is also activated and supplied with energy via this evaluation unit. The reading device 18 is connected with an antenna 20 for transmitting and receiving signals, wherein electromagnetic energy is also transmitted via the antenna 20 in the direction of the RFID tag 10 (arrow 22). This energy is stored in the RFID 10 tag and used for operating the RFID tag 10, so that the RFID tag can be operated without a dedicated energy source. The antenna 20 is also used to receive data (arrow 24) transmitted by the RFID tag 10, in particular by its antenna 12.

Figure 2:
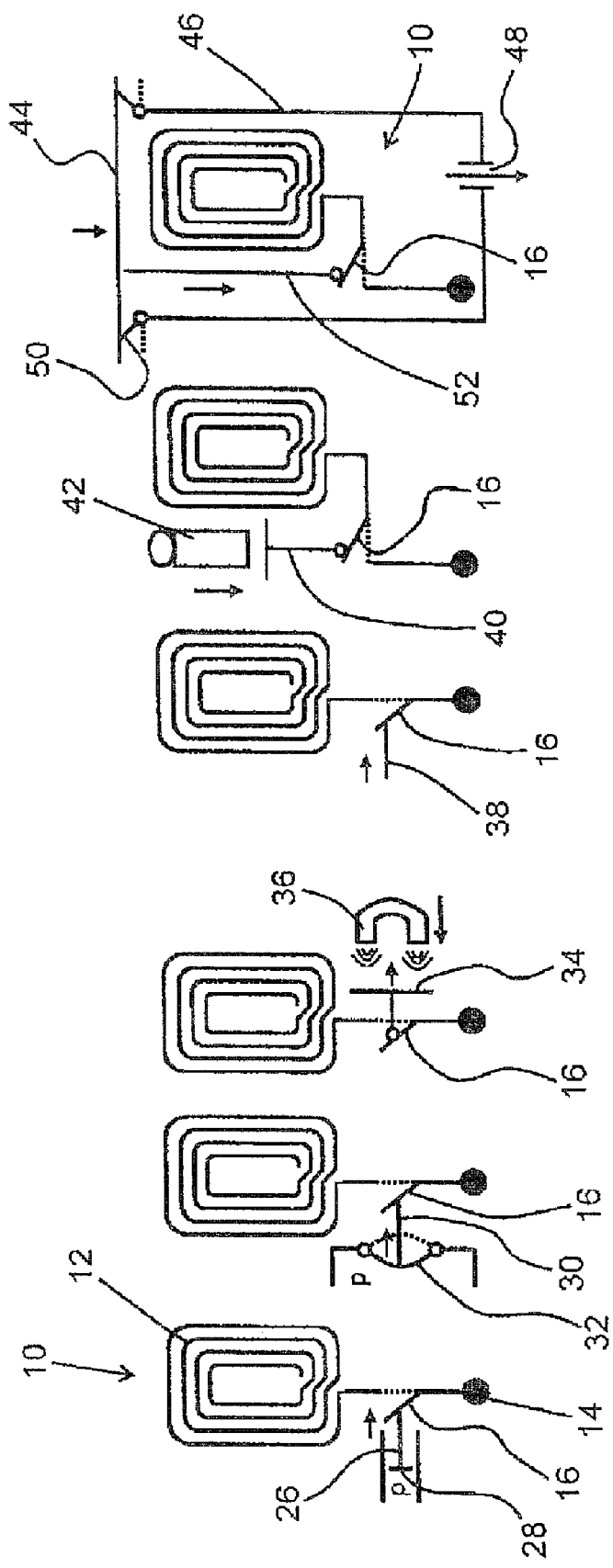
FIG. 2 various embodiments of the RFID tag according to FIG. 1.

FIG. 2 illustrates six exemplary embodiments wherein the switching element 16 is actuated in different ways.

In the exemplary embodiment of the FIG. 2a, the switching element is connected with the piston rod 26 of a piston 28, which is displaced by a pressure p generated by an (unillustrated) vacuum handling device. The displacement of the piston 28 causes the switching position of the switching element 16 to change between an (illustrated) open position and a closed position, thereby connecting the antenna 12 with the RFID chip 14.

In the exemplary embodiment of FIG. 2b, the switching element 16 is connected to a pushrod 30, wherein the pushrod 30 is moved by a membrane. In this embodiment, too, the membrane 32 responds to a pressure p applied to one side of the membrane, moving the membrane 32 and the pushrod 30, thereby also moving the switching element 16.

In the exemplary embodiment of FIG. 2c, the switching element 16 is connected with a ferromagnetic element 34 which is attracted by an approaching magnet 36. The switching element is hereby moves into its closed position. Alternatively, the switching element 16 may also be connected with a magnet which is attracted by an approaching ferromagnetic element.

The switching element 16 of the exemplary embodiment illustrated in FIG. 2d is connected with a manually actuatable button 38, so that the antenna 12 can be manually switched on and switched off, i.e., connected to or disconnected from the RFID chip.

In the exemplary embodiment of FIG. 2e, the switching element 16 is operated by a button 40 which can be actuated by gravity, wherein the weight 42 symbolizes, for example, a workpiece 44 resting on an (unillustrated) vacuum gripper.

FIG. 2f shows an exemplary embodiment wherein the RFID tag 10 is integrated, i.e., molded, in a vacuum gripper 46. This vacuum gripper 46 as an opening 48 to which a vacuum can be applied, so that the workpiece 44 which rests on sealing lips 50 can be drawn in by the vacuum gripper 46. The vacuum gripper 46 is deformed by the suction so that a pushrod or button 52 is moved and pressed into the vacuum gripper 46 which then actuates the switching element 16 in the vacuum gripper 46.

The various illustrated embodiments are only exemplary to enable a better understanding of the invention, without limiting the invention. According to the invention, a switching element 16 is arranged between the antenna 12 and the RFID chip 14 of the RFID tag 10 which can be used to disconnect the antenna 12 from the RFID chip 14. This switching element 16 can, for example, only be actuated when the component, in the present example the vacuum gripper 46, is properly inserted in the vacuum handling device.

The invention claimed is:

1. A vacuum handling device of for fixing or transporting workpieces, comprising:
   at least one component having an RFID tag, with the RFID tag comprising an RFID chip and an antenna, and
   a switching element connected between the RFID chip and the antenna and constructed to disconnect the RFID chip from the antenna,
   wherein the switching element is actuated by vacuum in the vacuum handling device.

2. The vacuum handling device of claim 1, wherein the switching element is a single-throw switch or a changeover switch.

3. The vacuum handling device of claim 1, wherein the switching element galvanically decouples the RFID chip from the antenna.

4. The vacuum handling device of claim 1, wherein the switching element is a single-throw switch or a changeover switch.

5. A vacuum handling device for fixing or transporting workpieces, comprising:
   at least one component having an RFID tag, with the RFID tag comprising an RFID chip and an antenna, and
   a switching element connected between the RFID chip and the antenna and constructed to disconnect the RFID chip from the antenna,
   wherein the switching element is actuated via a button arranged in the vacuum handling device, with the button being operated in response to a workpiece contacting the button.

6. The vacuum handling device of claim 5, wherein the switching element galvanically decouples the RFID chip from the antenna.

7. The vacuum handling device of claim 5, wherein the switching element is a single-throw switch or a changeover switch.

8. A vacuum handling device for fixing or transporting workpieces, comprising:
   at least one component having an RFID tag, with the RFID tag comprising an RFID chip and an antenna, and
   a switching element connected between the RFID chip and the antenna and constructed to disconnect the RFID chip from the antenna,
   wherein the switching element is mechanically coupled with a button, wherein the button is actuated manually, by gravity or by a vacuum.

9. The vacuum handling device of claim 8, wherein the switching element galvanically decouples the RFID chip from the antenna.

10. The vacuum handling device of claim 8, wherein the switching element is a single-throw switch or a changeover switch.

* * * * *